May 10, 1960 E. L. HAVENS 2,935,979
VALVE SPRING SPACER
Filed Nov. 7, 1958

INVENTOR.
ELWOOD L. HAVENS
BY
Barnes, Kisselle, Raisch & Choate
ATTORNEYS

United States Patent Office 2,935,979
Patented May 10, 1960

2,935,979
VALVE SPRING SPACER

Elwood L. Havens, Dearborn, Mich., assignor to Silver Seal Products Co., Lincoln Park, Mich., a corporation of Michigan Application November 7, 1958, Serial No. 772,443

6 Claims. (Cl. 123—188)

This invention relates to a valve spring spacer.

Frequently, it is desirable to increase the tension of a valve spring in an automotive engine by inserting a shim or spacer of certain thickness dimension between the spring and the block.

It is an object of the invention to provide a valve spacer unit which compensates for spring wear in the block and on the spring cap and also on the spring ends.

It is also an object to provide a device which can compensate for loss of spring tension due to torsional relaxation resulting from heat and use and due to a possible change of dimension resulting from the wear of the valve and the block and also to a valve grinding operation.

It is an object further to provide a spacer unit which is particularly adapted to insulate the spring to a degree from the heat of the valve block and also to prevent circumferential creeping which increases the wear.

It is an object of the present invention to provide a spacer unit which can be applied without removing the valve spring and valve stem from the assembly. This is accomplished by a construction of the spacer which permits the spacer to be joined around the valve stem and locked in place by the pressure of the spring.

It is a further object to provide an apertured disc formed of two identical semi-circular parts which interengage axially.

Other objects and features of the invention relative to various details of construction will be apparent in the following description and claims.

Figure 1:
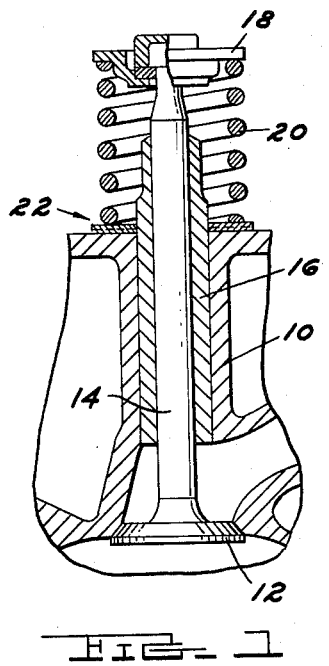
Figure 2:
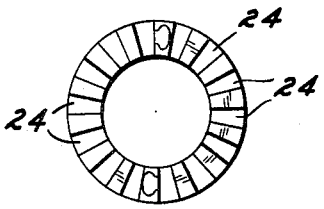
Figure 3:
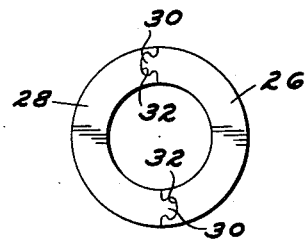
Figure 5:
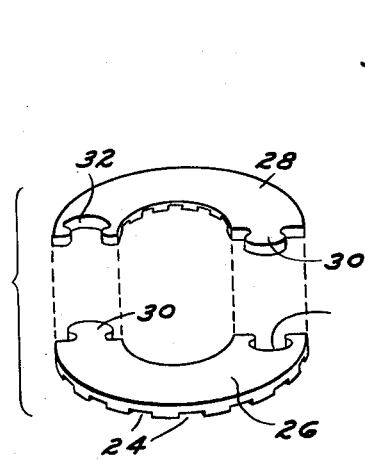
Figure 4:
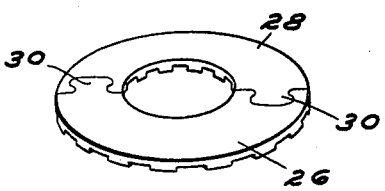

Drawings accompany the description and the various views thereof may be briefly described as:

Figure 1, a sectional view of a spring assembly showing the spacer in place;

Figure 2, a plan view of the bottom surface of the spacer;

Figure 3, a plan view of the top of the spacer;

Figure 4, a perspective view showing the spacer assembled;

Figure 5, a perspective view showing the manner in which the spacer is assembled to a locking position.

Referring to the drawings:

In Figure 1, a motor block 10 has a valve 12 and a valve stem 14, the stem projecting upwardly out of the block through a sleeve 16. At the top of the valve stem 14 is a spring seat 18 suitably locked in place on the end of the valve stem and serving as a seat for the valve spring 20. A spacer shim 22 is shown in position around the sleeve 16. In Figure 2 the bottom surface of the shim is shown to have a series of radial surface slots 24 which interrupts the surface to provide air passages and also engaging corners which cooperate with the motor block to prevent turning of the spacer shim. The shim is formed of two pieces 26 and 28, each piece being semi-circular in form and having a dove-tail projection 30 shaped to cooperate with a dove-tail opening 32 in the other end of the adjacent portion. Thus the parts move together axially as shown in Figure 5 and they can be assembled around the sleeve 16 by lifting the spring 20 temporarily and inserting the parts together. Release of the spring will hold the parts in engagement so that they cannot separate. With this construction, the spacers may be changed from time to time to compensate for valve wear or to replace the spacer if the valve has worn itself into the backface thereof.

It will be seen that by placing the projection 30 on one end of the semi-circular unit and the opening 32 at the other end of the same unit, the parts are actually identical and one die will suffice to make all of the parts. Then any one pair of the two parts will join together as shown. If desired, of course, both of the projections could be put on one part and they would serve equally well in the assembly. They would, however, not have the advantages above described in connection with the manufacture. The spacers, of course, may be made of different thicknesses and also different groove constructions as described in my co-pending application, Serial No. 619,829, filed Oct. 15, 1956, now matured into Patent No. 2,868,188.

I claim:

1. A spacer shim for altering valve spring tension in an internal combustion engine which comprises a two-piece disk formed of two semi-circular portions of identical construction, each having one end with an interlock projection and one end with a lock cavity, the projection and the cavity of one semi-circular portion being designed to interengage respectively with the cavity and interlock projection of another semi-circular portion thus forming a complete apertured disk.

2. A device as defined in claim 1 in which the projections and the cavities interlock in an axial motion which cannot disengage radially and thus are held in interlocked relation, when installed, by the spring pressure of the valve.

3. A device as defined in claim 1 in which each said projection has the shape of a dovetail and in which each said cavity has the shape of a complementary dovetail.

4. A spacer shim for altering valve spring tension in an internal combustion engine which comprises a two piece disk formed of two semi-circular portions of identical construction, said disk being of uniform predetermined thickness having at least one surface provided with interruptions extending radially to adapt it to mechanically engage a surface in contact therewith under pressure, said radial interruptions comprising a plurality of formed grooves on one surface only, said grooves being open at their outer and inner extremities and being wider at the outer extremities, the sides of said grooves being radial to the device, each portion of said disk having one end with an interlock projection and one end with a lock cavity, each said projection and cavity lying substantially entirely in an uninterrupted portion of said disk, the projection and the cavity of one semi-circular portion being designed to interengage respectively with the projection and cavity of another semi-circular portion thus forming a complete apertured disk.

5. The device as defined in claim 4 in which each projection has a dovetail shape and each cavity has a complementary dovetail shape, said projections and cavities interlocking in an axial motion which cannot disengage radially and adapted to be held in interlocked relation by the spring pressure of the valve.

6. The combination in an internal combustion engine of a valve seat, a valve guide co-axial therewith spaced from the seat and projecting beyond a surface radial to said guide, a unitary valve and stem associated with said seat, the stem passing through said guide and projecting therefrom, a valve spring cap on the end of said guide overlying said radial surface, a spring interposed between said surface and said guide to move said valve to a closed position relative to said seat, and a spring tension control unit comprising an apertured disk concentric with said valve guide and lying against said radial face and held in position against radial displacement by said valve guide, said disk being formed of two segmental circular parts each having an opening to embrace the valve stem, and means at the ends of said parts to interengage axially to lock the parts against radial disengagement, whereby said disk may be replaced by lifting said spring, moving one part of said disk axially relative to another part to disengage the parts, and inserting a pair of parts into position and axially engaging said parts, and thereafter releasing said springs to hold the ends of said parts in locked relation.

References Cited in the file of this patent
UNITED STATES PATENTS

| | | |
|---|---|---|
| 2,613,656 | Leach | Oct. 14, 1952 |
| 2,868,188 | Havens | Jan. 13, 1959 |